Sept. 11, 1951
C. WHITTIER
2,567,534
LAND LEVELER
Filed Jan. 19, 1946
2 Sheets-Sheet 1
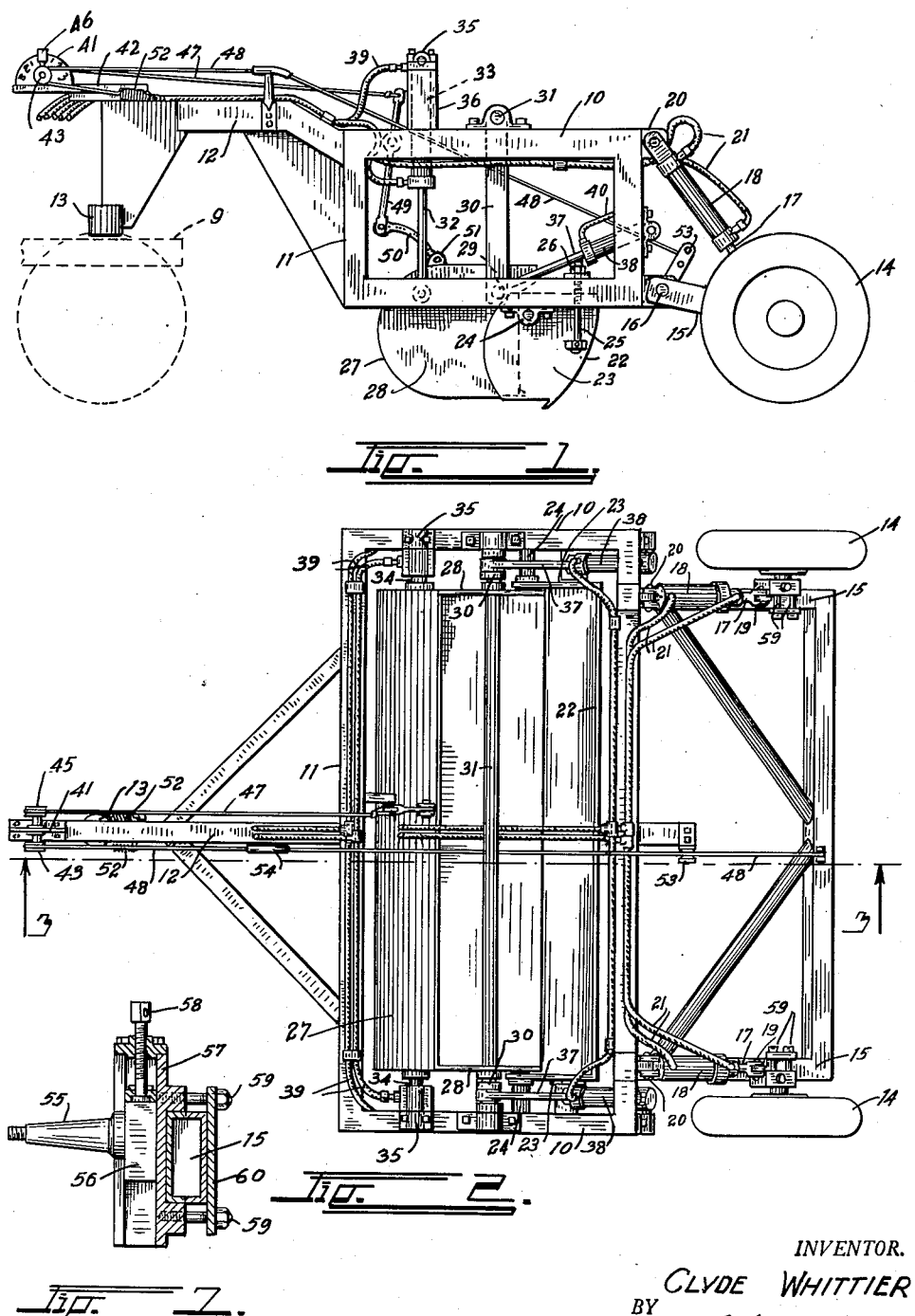
INVENTOR.
CLYDE WHITTIER
BY
ATTORNEY Sept. 11, 1951   C. WHITTIER   2,567,534
LAND LEVELER
Filed Jan. 19, 1946   2 Sheets-Sheet 2
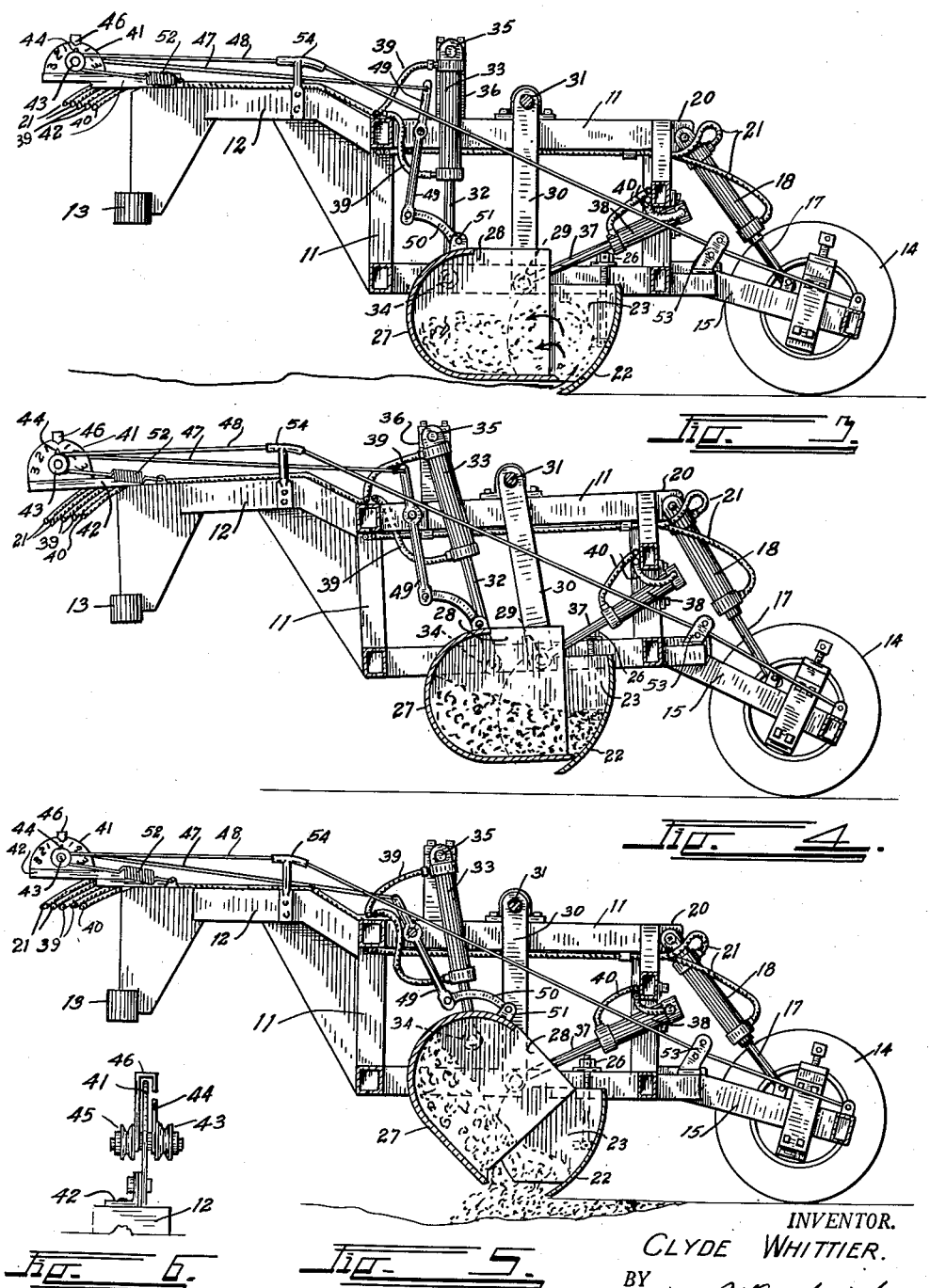
INVENTOR.
CLYDE WHITTIER.
BY
ATTORNEY.

Patented Sept. 11, 1951

2,567,534

UNITED STATES PATENT OFFICE 2,567,534

LAND LEVELER

Clyde Whittier, Center, Colo., assignor of fifty per cent to Harold E. Schall, Monte Vista, Colo.

Application January 19, 1946, Serial No. 642,331

4 Claims. (Cl. 37—129)

This invention relates to a land leveler and has for its principal object the provision of an exceedingly rigid and highly efficient device of this character in which the earth removed from the high spots of an area will be automatically stored so that it can be released and spread to fill in the low spots while the leveler is in transit across the area.

Other objects of the invention are to provide a simple and highly efficient and easily operated system for controlling the various leveling elements; to provide visible means for indicating to the tractor operator the position of the various elements of the leveler so that he will be constantly informed as to the operation of the machine; and to provide hydraulic means for controlling the position of the leveler elements and the height thereof above the ground, all controllable from the operator's position so that the entire device can be efficiently operated by a single man.

Other objects and advantages reside in the detail construction of the invention, which is designed for simplicity, economy and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a side elevation of the improved land leveler illustrating, in broken line, the position of the tractor or towing vehicle;

Fig. 2 is a plan view thereof;

Figs. 3, 4, and 5 are sectional views taken on the line 3—3, Fig. 2, and illustrating the scraping position, the earth carrying position, and the dumping and spreading position, respectively, of the device;

Fig. 6 is a detail edge view of an indicating dial used on the improved attachment; and Fig. 7 is a detail sectional view illustrating a wheel mounting employed on the improved leveler.

In Fig. 1, the position of the towing vehicle is indicated at 9. This vehicle is any of the conventional tractors provided with a hydraulic pumping system for hydraulically operating various attachments. Hydraulic pressure from the tractor is employed for controlling the elements of this attachment the flow being controlled by suitable valves at the operator's position.

The improved leveler is mounted on a rectangular supporting frame consisting of two end frames 10, a front frame 11 and a supporting tongue 12. The tongue 12 terminates at its forward extremity in a fifth wheel pivot bearing 13 by means of which it is mounted on the king pin of the fifth wheel of the conventional towing tractor. The rearward extremity of the frame 10 is supported upon ground engaging wheels 14.

The wheels 14 are journalled on rearwardly-extending U-shaped wheel bracket member 15 which is hinged at its forward extremities to the rear of the frame 10 upon suitable hinge pins 16. The wheel bracket members 15 are braced from the end frames 10 by means of hydraulic plungers 17 operating in hydraulic cylinders 18. The plungers 17 are hinged to the bracket members 15 in suitable hinges 19, and the cylinders 18 are similarly hinged to the end frames 10 upon hinges 20. Hydraulic fluid is conducted to the opposite extremities of the cylinders 18 by means of hydraulic lines 21.

It can be readily seen that, when the hydraulic fluid is admitted to the upper extremities of the cylinders 18, the plungers 17 will be forced downwardly, causing the end frames 10 to be lifted, as shown in Fig. 4.

The actual scraping is done by means of a curved scraper blade 22 terminating in end aprons 23. The end aprons 23 are formed with pivot studs 24 by means of which the scraper blade is pivotally secured beneath each of the end frames 10.

The scraper blade can be rotated about its pivot studs 24 to any desired angle by means of jack screws 25 operating in nuts 26 on each of the end frames. Thus, it can be seen that the angle of the scraper can be controlled by manually operating the jack screws 25, and the height of the scraper above or below the ground can be adjusted hydraulically through the pistons 18 and plungers 17.

An earth-receiving trough is mounted ahead of the scraper 22. The trough consists of a curved plate 27 extending for a distance horizontally to provide a flat bottom, thence extending forwardly and upwardly to form a closed front. The extremities of the plate 27 are attached to end walls 28. Each of the end walls 28 is formed with an outwardly projecting hanger stud 29. The studs 29 are rotatably mounted in the lower extremities of hangers 30 suspended from a cross shaft 31 extending across between the end frames 10.

The weight of the rearward portion of the trough plate 27 and its contents is supported by the hangers 30. The weight of the forward portion thereof is supported on plungers 32 extending from hydraulic cylinders 33. The plungers 32 connect with plunger studs 34 in the two end walls 28, and the cylinders 33 are supported on bearings 35 from pedestals 36 arising from the end frames 10.

A hydraulic plunger 37 connects with each of the hanger studs 29 and extends rearwardly and upwardly within a hydraulic cylinder 38. The hydraulic fluid is conducted to and from the cylinder 33 through hydraulic hoses 39, and this fluid is conducted to and from cylinders 38 through similar hydraulic hoses 40.

When being used to scrape off high surfaces of the ground, the various parts are arranged substantially, as shown in Fig. 3. Forward movement of the scraper blade 22 cuts the surface from the ground. The cut surface rises upwardly along the curved surface of the blade 22 and topples forwardly into the receiver 27, as shown in Fig. 3. This forward throw of the scraped dirt is facilitated by the speed at which the attachment is drawn.

When the receiver is filled, the hydraulic cylinders 38 are operated to pull the receiver rearwardly against the blade 22, as shown in Fig. 3, to form an enclosed dirt container. The cylinders 18 are then operated to lift the frame of the attachment, as shown in Fig. 4, and the device is driven to the point where it is desired to dump the accumulated dirt.

Should this dirt be used to fill a low place in the ground surface, the hydraulic cylinders 33 are operated to lift the forward portion of the receiver 27, as shown in Fig. 5, so as to dump the dirt into the low place ahead of the scraper blade, which acts to level the filled surface, as shown in Fig. 5.

Thus, it can be seen that the operator has complete control of the cutting and filling at all times. It is difficult, however, for the operator to see the position of the scraper and trough from his position on the tractor. This is remedied by means of an indicating device positioned in view of the operator.

The indicating device consists of a semi-circular dial plate 41 supported on the forward extremity of a bracket arm 42 extending from the forward extremity of the tongue 12. The plate 41 carries a suitable index scale as illustrated. A first pulley wheel 43 is rotatably mounted on one face of the dial plate 44 and a second pulley wheel 45 is similarly mounted on the other face thereof. An indicating hand 44 is secured to the pulley 43 and a second indicating hand 46 is secured to the pulley 45. The second indicating hand 46 is hooked about the arcuate edge of the dial plate 41 so that both hands indicate positions on the same index on the operator's side of the dial.

The indicating hands are actuated by means of flexible cables wrapped about the pulleys 43 and 45, there being one cable 47 operable from the movements of the trough plate 27 and a second cable 48 operable from the movements of the wheel bracket member 15. The cable 47 extends to the pulley 45 from the upper extremity of a rocking lever 49 pivoted intermediate its extremities on the frame above and ahead of the trough plate 27. The lower extremity of the lever 49 is connected by means of a connecting link 50 with a hinge pin 51 on the trough plate 27.

The cable 48 extends from about the other pulley 43 through a guide 53 to a connection with the rear of the wheel bracket member 15. The cable 48 slides over a suitable guide 54. The cables 47 and 48 wrap about the pulleys 45 and 43 and terminate in tension springs 52 which maintain the cables taut.

It can be readily seen that upward movement of the supporting frame and the scraper blade 22 will cause the cable 48 to rotate the indicating hand 44 rearwardly and that upward or rearward movement of the trough plate 27 will cause the cable 47 to rotate the indicating hand 46 forwardly. Therefore the relative positions of the blade and trough can be noted at all times by the operator.

The scraper blade can be pre-set in the most advantageous position for throwing, carrying and spreading by means of the jack screw 25. The height of the scraper with relation to the ground surface can then be regulated from the operator's position by adjusting the position of the plungers 17 in the cylinders 18.

Means are provided for leveling or inclining the machine transversely as shown in detail in Fig. 7. This is accomplished by mounting one or both of the wheels 14 on an axle stud 55 which projects from a cross-head block 56. The cross-head block 56 is vertically moveable in a guide box 57 by means of a jack screw 58 which is threaded through the top of the box and carries the block 56. The box is clamped to the wheel bracket member by means of suitable clamp bolts 59 and a clamping plate 60 as shown in Fig. 7.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A land leveler comprising: a supporting frame; wheels supporting the rear of said frame; a scraper blade extending transversely across the bottom of said frame to be brought into contact with the ground, said blade curving rearwardly and upwardly on a relatively steep incline to roll earth forwardly as said frame is moved forwardly; a trough plate suspended from said frame, the rear edge of said plate being substantially parallel to and in front of said blade, thence extending horizontally forward to provide a substantially flat bottom to receive the earth rolled forwardly by said blade, thence extending upwardly to form a closed front; a hanger hingedly suspended from said frame at each extremity of said trough plate and swingingly supporting the latter from the former so that said trough plate may be swung forward and back; and means for swinging said hangers forward and back to cause said plate to approach and recede from said blade.

2. A land leveler comprising: a supporting frame; wheels supporting the rear of said frame; a scraper blade extending transversely across the bottom of said frame to be brought into contact with the ground, said blade curving rearwardly and upwardly on a relatively steep incline to roll earth forwardly as said frame is moved forwardly; a trough plate suspended from said frame, the rear edge of said plate being substantially parallel to and in front of said blade, thence extending horizontally forward to provide a substantially flat bottom to receive the earth rolled forwardly by said blade, thence extending upwardly to form a closed front; a hanger hingedly suspended from said frame at each extremity of said trough plate and swingingly supporting the latter from the former so that said trough plate may be swung forward and back; an end wall fixed at each extremity of said trough plate; pivot means at each end wall pivotally attaching said trough plate to said hangers; means for swinging said hangers forward and back to vary the distance between the rear edge of said plate and said blade; and independent means for rotating said plate about said pivot means to discharge the collected earth ahead of said blade.

3. A land leveler comprising: a frame; means for attaching the forward extremity of said frame to a supporting vehicle; a wheel bracket extending rearwardly from said frame; hinge means securing said wheel bracket to said frame; ground-engaging wheels carried by said wheel bracket; means for swinging said wheel bracket about the hinge axis to raise and lower the rear extremity of said frame; a scraper blade carried by said frame to raise and lower therewith; a trough carried from said frame ahead of said scraper blade to receive earth therefrom; means for swingingly and rotatably supporting said trough from said frame; means for swinging said trough to and from said blade; independent means for rotating said trough; an indicating scale supported from said frame; two independent indicating hands movable relative to said scale; a first movement-transmitting means extending from said wheel bracket to one of said hands for transmitting the movements of the former to the latter; and a second movement-transmitting means extending from said trough to the other indicating hand for transmitting the movements of the former to the latter.

4. In a land leveling device of the type having a scraper blade supported in a supporting frame, means for receiving the earth scraped by said blade, comprising: a trough plate positioned forwardly of and parallel to said blade; aligned hanger studs projecting outwardly from each extremity of said trough plate about the axis of which said trough may be rotated; a hanger hingedly mounted on said frame at each extremity of said trough plate, said hangers depending downwardly and rotatably receiving said studs at their lower extremities so that the axis of said studs may be swung forward and back independently of the rotation of said trough plate about the axis of said studs; a first means for swinging said hangers; and a second means for rotating said trough plate.

CLYDE WHITTIER.

REFERENCES CITED

The following references are of record in the file of this patent:

UNITED STATES PATENTS

| Number | Name | Date |
| --- | --- | --- |
| 2,078,500 | Maloon | Apr. 27, 1937 |
| 2,219,478 | Gurries | Oct. 29, 1940 |
| 2,328,715 | Drott | Sept. 7, 1943 |
| 2,380,021 | Brown et al. | July 10, 1945 |
| 2,395,334 | Lichtenberg | Feb. 19, 1946 |
| 2,396,287 | Robb | Mar. 12, 1946 |